Feb. 11, 1969

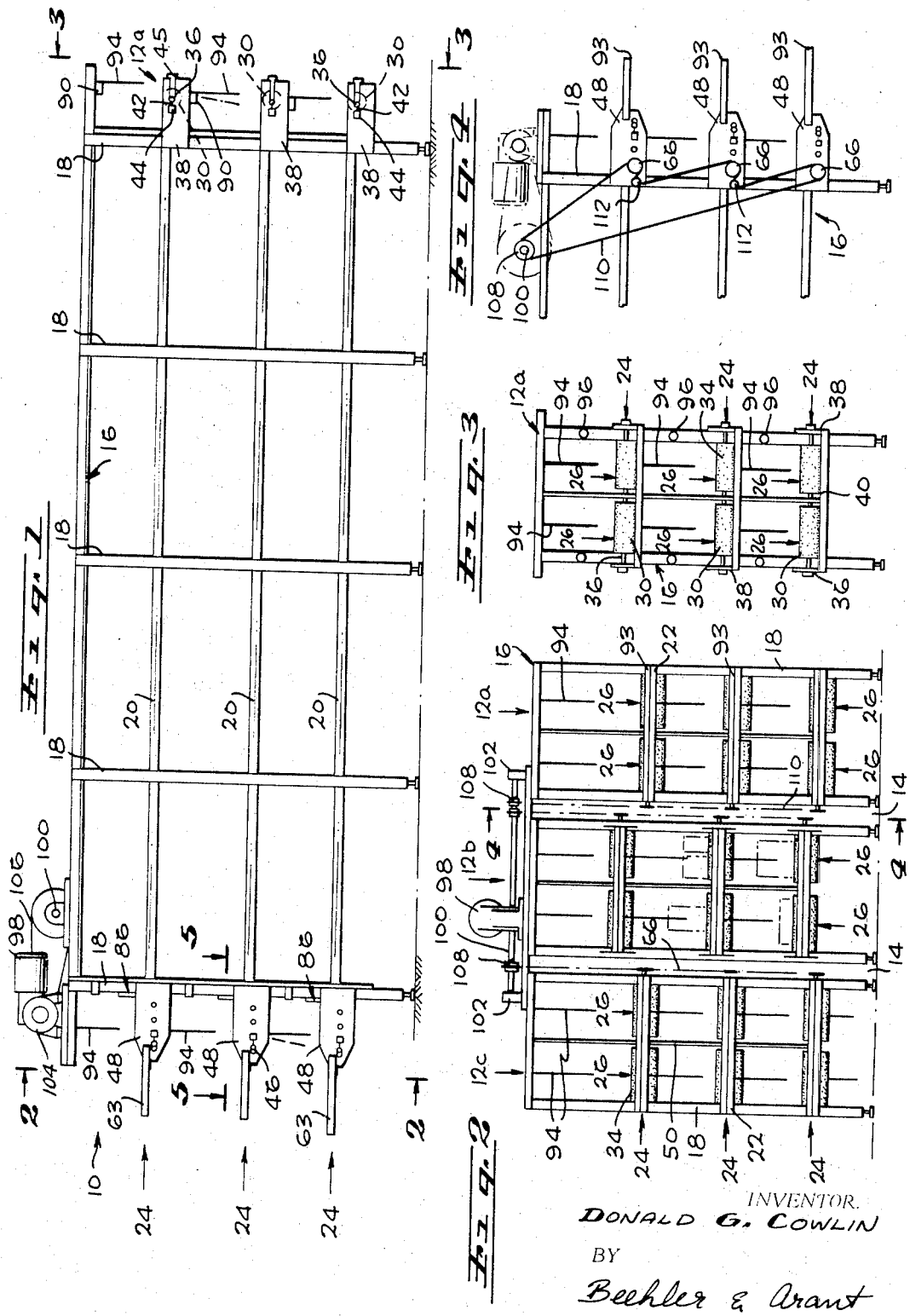

D. G. COWLIN 3,426,605

BELT COUPLED DRIVE MEANS

Filed July 13, 1967

INVENTOR.
DONALD G. COWLIN
BY
Beehler & Arant
ATTORNEYS

INVENTOR.
DONALD G. COWLIN
BY
Beehler & Arant
ATTORNEYS

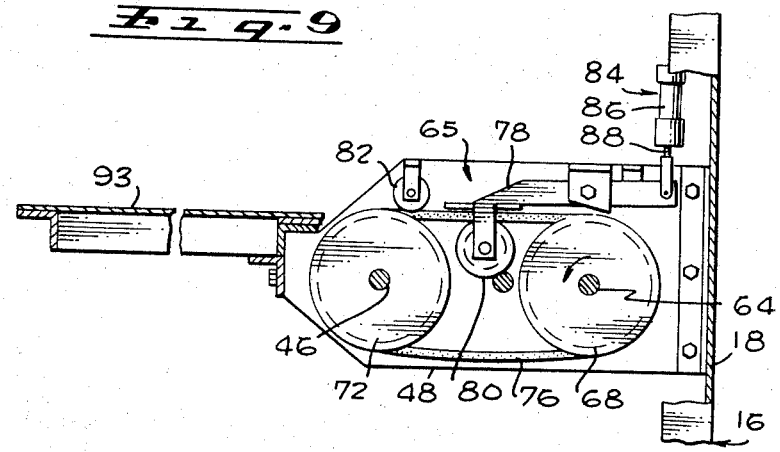
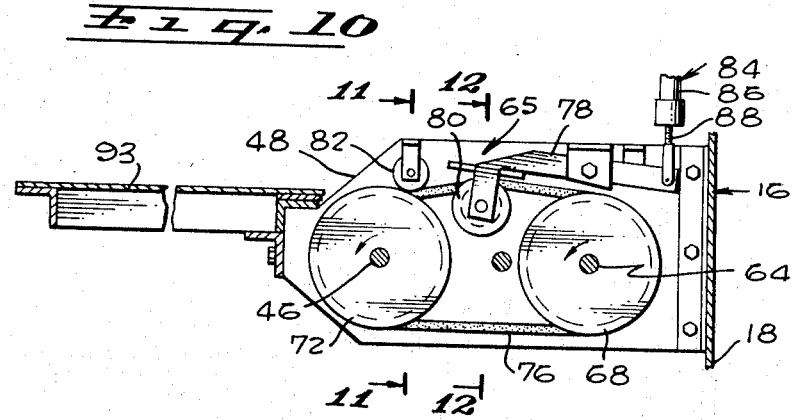
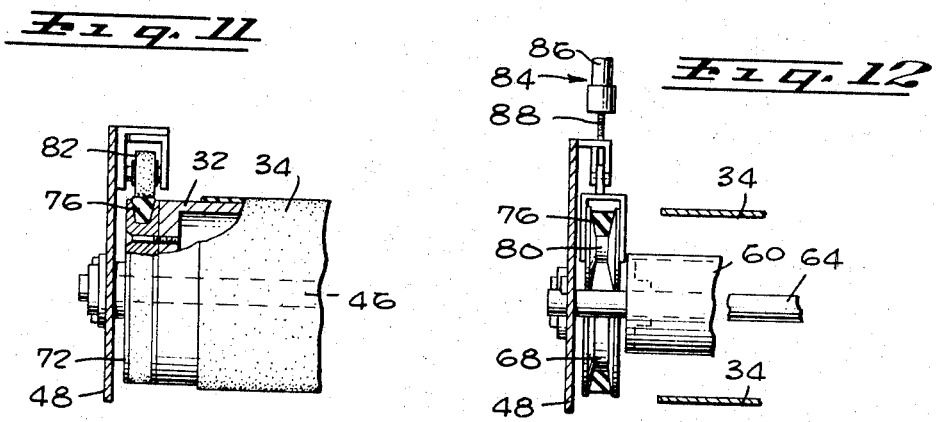

United States Patent Office 3,426,605
Patented Feb. 11, 1969

3,426,605
BELT COUPLED DRIVE MEANS
Donald G. Cowlin, 555 Riverdale Drive,
Glendale, Calif. 91204
Continuation-in-part of application Ser. No. 490,182,
Sept. 27, 1965. This application July 13, 1967, Ser. No.
653,169
U.S. Cl. 74—219       4 Claims
Int. Cl. F16h 7/62

ABSTRACT OF THE DISCLOSURE

Associated with the conveyors in a combined article conveyor and storage apparatus are drive means for independently driving each of a number of generally parallel conveyors in a direction to move the articles thereon from the loading end to the delivery end of the apparatus. The ends of the conveyors are exposed at the loading and delivery ends, respectively, of the apparatus in such manner as to facilitate placement of the articles to be handled on the loading end of the conveyors and removal of selected articles from the delivery ends of the conveyors.

---

This is a continuation-in-part of application Ser. No. 490,182, filed Sept. 27, 1965, now Patent No. 3,389,778.

This invention relates generally to a driving means for article handling systems and has more particular reference to selective driving means for a combined article conveyor and storage apparatus for transporting from a supply station to an assembly station a variety of articles to be selectively assembled into parcels and providing at the assembly station a continuously filled, readily accessible array of such articles from which selected articles may be quickly and easily removed for assembly into parcels.

In use, the conveyor-storage apparatus is installed in such a way that its loading end is readily accessible to a supply station where the different articles to be handled are placed on the various conveyors of the apparatus and its delivery end is readily accessible to an assembly station where the articles are assembled for parceling. Each conveyor is assigned to handle only selected articles and is normally initially loaded from one end to the other with such articles. Whenever the delivery end of any conveyor is emptied, that conveyor is operated to advance the following article or articles thereon to the delivery end of the apparatus. An additional article or articles may be placed on the loading end of the conveyor, thereby to continuously maintain each conveyor in its fully loaded condition, or the conveyor may be allowed to become empty before it is reloaded.

At this point, it is evident that the present conveyor-storage apparatus performs three distinct functions. First, the apparatus provides a conveyor system for transporting the articles being handled from the supply station to the assembly station. Second, the apparatus provides a storage facility of maximum storage capacity and minimum size for storing the articles until they are needed at the assembly station. Third, the apparatus provides at the assembly station a continuously filled, readily accessible array of all of the various articles from which selected articles may be quickly and easily removed for assembly into parcels.

An important aspect of the invention is concerned with the conveyor drive means. This drive means embodies a single drive motor for all of the conveyors and novel drive coupling means between the motor and conveyors, whereby each conveyor may be operated independently of the remaining conveyors.

It is now evident that the present conveyor-storage apparatus may be employed to advantage in a variety of industries. The apparatus is particularly useful, however, in the linen supply industry in connection with sorting, storing and transporting various items of flat work and dry folded goods from the finishing department to the order department and assembling such items into parcels. For this reason, the invention will be disclosed herein primarily in connection with this particular application thereof.

Linen supply is a specialized branch of the laundry industry in which various laundered items such as towels, aprons, table linen, bed linen, garments and the like, are supplied to commercial, professional, and industrial users. The laundered items furnished by a typical linen supply plant fall into three general categories, to wit, starch work consisting of wearing apparel which is finished on garment presses, flat work consisting of items such as towels, aprons, table linen, sheets, and so on, which are finished and folded on flat work ironers, and dry folded articles consisting of bath towels and other items which are dried in drying tumblers and folded without ironing. In the great majority of linen supply plants, the major portion of items processed comprise flat work and dry folded goods.

In the linen supply industry, clean linen is delivered and soiled linen is picked up from each customer on a regularly scheduled basis. When an order from a new customer is received, an estimate is made of the linen items necessary to satisfy his requirements from one delivery to the next, and the required items are delivered to the customer. On the second delivery, the customer is furnished with the same number of items and his soiled linen is picked up. This soiled linen is returned to the linen supply plant where it is counted and itemized. Prior to the next delivery to the customer, his order is made up from the soiled linen count, the listed items being assembled from open stock, bundled, and invoiced in readiness for the next delivery.

As noted above, the major portion of the linen processed in a typical linen supply plant comprises flat work and dry folded items. These items are of many different kinds, sizes and shapes. The existing methods of handling such items in the plant are unsatisfactory because of the excessive floor space required to store the items and transport the items from the finishing department to the order department where the customers' orders are filled. Moreover, the existing methods result in much wasted time and motion of plant personnel. Thus, according to the existing linen handling methods, the finished linen goods are transferred from the finishing department to a storage area by means of floor trucks, conveyors, or the like. Upon arrival at the storage area, the finished goods are sorted and stacked on shelves or other available storage facilities. Each customer's order is then filled by selecting the appropriate items from these several stacks of finished goods. In actual practice, several different methods are employed in filling customers' orders. However, the preferred method is to assemble the requisite items in order on a conveyor belt which carries the completed orders to a checker who checks each order for errors. Thereafter, the completed orders are parceled for subsequent delivery to the customers. This method of assembling the customers' orders requires excessive floor space and involves much wasted time in walking to assemble items from different locations at one point before the order is completed. In a typical lined supply plant, the finished linen goods are stored in some thirty or more storage locations arranged along the conveyor belt and from which the various items required for each customer's order are selected.

It is evident at this point, therefore, that a definite need exists for an improved article handling system for storing and transporting the various finished linen items involved in the operation of a linen supply plant. The present combined article conveyor and storage apparatus is ideally suited to this purpose. As will appear from the ensuing description, however, the apparatus of the invention is not limited in usefulness to the linen supply industry and may be employed to advantage in any application requiring the storage of a variety of articles to be assembled for parceling, transportation of the articles from a supply station to an assembly station, and accessibility of the various articles at the assembly station to facilitate assembly of selected articles into parcels.

In the embodiment illustrated in the drawings:

FIGURE 1 is a side elevation of a combined article conveyor and storage apparatus;

FIGURE 2 is an end view of the apparatus looking in the direction of the arrows on the line 2—2 of FIGURE 1;

FIGURE 3 is an end view of the opposite end of one conveyor unit embodied in the apparatus, looking in the direction of the arrows on line 3—3 of FIGURE 1;

FIGURE 4 is a section taken on line 4—4 in FIGURE 2, with motor shown in phantom lines;

FIGURE 9 is a section taken on line 9—9 in FIGURE 5 and illustrating a clutch mechanism embodied in the apparatus in its disengaged condition;

FIGURE 10 is a view similar to FIGURE 9 illustrating the clutch mechanism in its engaged condition;

FIGURE 11 is a section taken on line 11—11 in FIGURE 10;

FIGURE 12 is a section taken on line 12—12 in FIGURE 10; and

Figure 5:
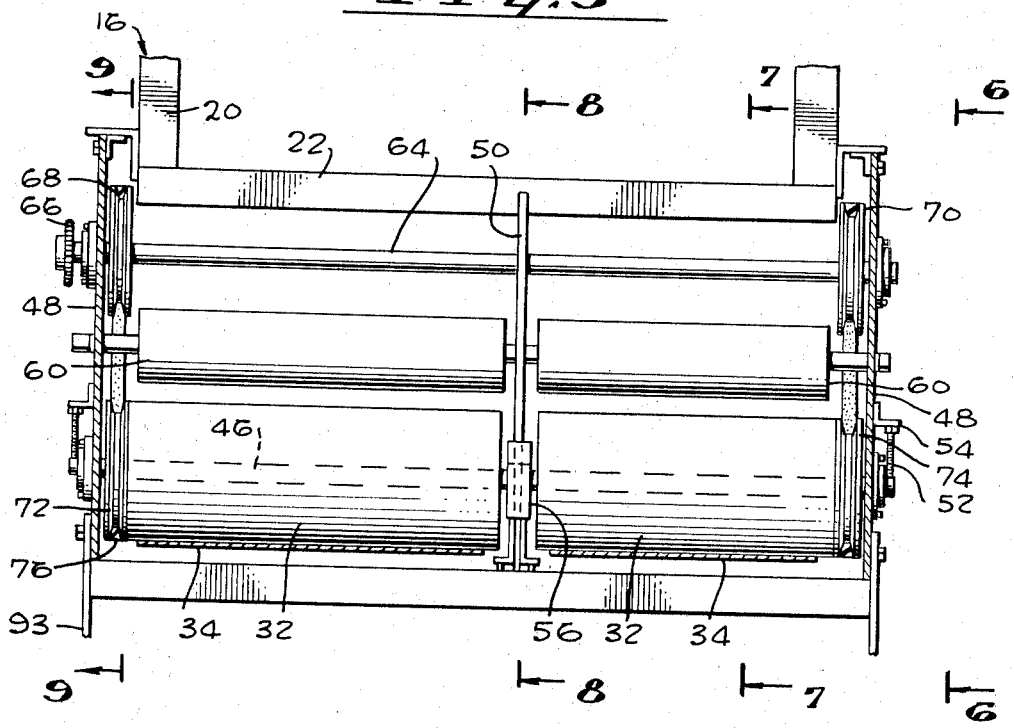
FIGURE 5 is an enlarged section taken on line 5—5 in FIGURE 1.

The combined article conveyor and storage apparatus 10 illustrated in these drawings comprises three conveyor units 12a, 12b, and 12c arranged side by side with a narrow space 14 between each pair of adjacent units. While only three conveyor units have been shown for the sake of clarity of illustration, it will become obvious as the description proceeds that the present apparatus may embody any number of conveyor units required by the particular application for which the apparatus is to be used. For reasons which will appear presently, the right-hand end of the apparatus, as the latter is viewed in FIGURE 1, will be hereinafter referred to as its loading end and the lefthand end of the apparatus will be referred to as its delivery end.

The three conveyor units 12a, 12b, and 12c are substantially identical and differ only in the minor variations hereinafter noted. Accordingly, only one of the units, namely unit 12a will be described in detail.

Conveyor unit 12a comprises an elongate frame 16 including a number of spaced upright frame members, or legs, 18 rigidly joined at several levels by longitudinal frame members 20 and transverse frame members 22. Mounted on the frame 16, one over the other, are three levels or tiers 24 of horizontal conveyors 26. Each tier 24 contains a pair of laterally adjacent conveyors. Each conveyor 26 comprises a pair of rollers 30 and 32 located at the loading and delivery ends respectively, of the frame 16 and an endless conveyor member or belt 34 trained about the rollers. The two rollers 30 at the loading ends of the laterally adjacent conveyors in each tier 24 are rotatably mounted on a common shaft 36. Each shaft 36 extends through longitudinal slots in a pair of outboard support brackets 38 secured to opposite sides, respectively, of the frame 16 and a center support bracket 40 secured to the frame between the rollers. The outboard ends of each shaft 36 seat against thrust screws 42 threaded in flanges 44 projecting from the outer sides of the bracket 38. Each center support bracket 40 mounts a longiutdinally slidable bearing (not shown) for the respective roller shaft, which bearing is movable endwise of the frame 16 by adjustment of a thrust screw 45. The two rollers 32 at the delivery ends of the pair of laterally adjacent conveyors 26 in each tier 24 are rotatably mounted on a common shaft 46. Each shaft 46 extends through longitudinal slots in a pair of outboard support brackets 48 secured to opposite sides, respectively, of the frame 16 and a center support bracket 50 secured to the frame between the rollers 32. The outboard ends of each shaft 46 seat against thrust screws 12 threaded in flanges 54 projecting from the outer sides of the brackets 48. Each center bracket 50 mounts a longitudinally slidable bearing 56 for the adjacent roller shaft 46, which bearing is movable lengthwise of the frame 16 by adjustment of a thrust screw 58. The several thrust screws 42, 45, 52, and 58 are adjustable to tension the conveyor belts 34.

Figure 7:
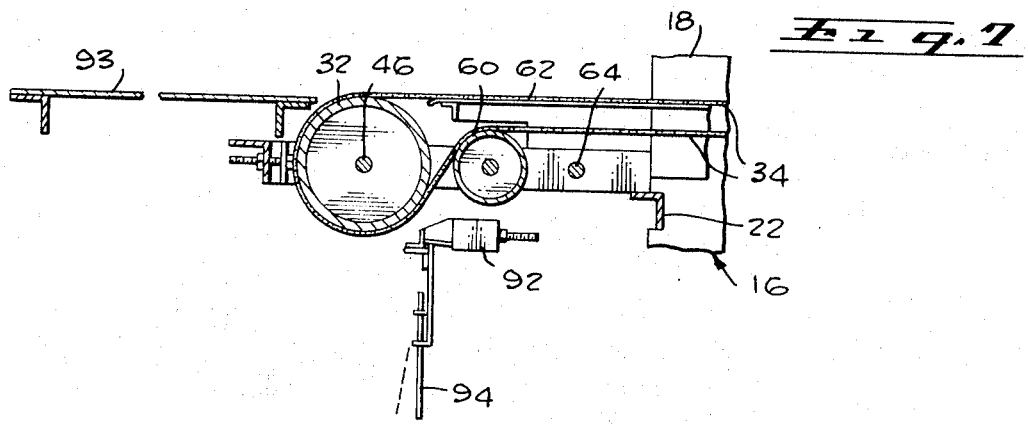
FIGURE 7 is a section taken on line 7—7 in FIGURE 5.
Figure 8:
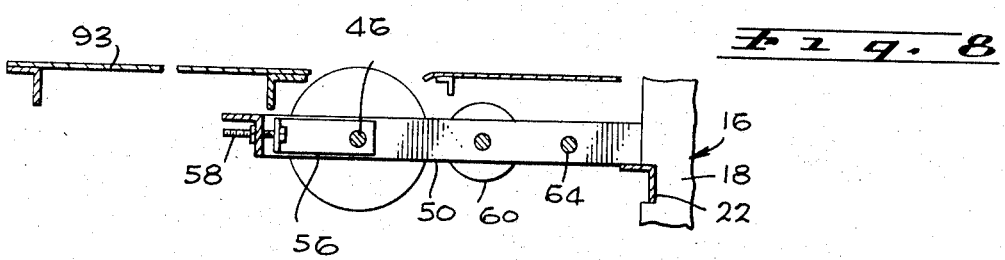
FIGURE 8 is a section taken on line 8—8 in FIGURE 5.

Rotatably mounted between each outboard roller support bracket 48 and the adjacent center roller support bracket 52 is a snub roller 60. Each conveyor belt 34 is trained about its respective supporting roller 32 and the adjacent snub roller 60 in the manner best illustrated in FIGURE 7. As will appear presently, the conveyor rollers 32 are driven in rotation to drive the conveyor belts 34. The snub rollers 60 are provided to increase the arc of driving contact between the belts and the rollers 32.

Mounted on the frame 16 below the upper run of each conveyor belt 34 is a bed plate 62 which may be constructed of sheet metal. Each bed plate extends substantially the full length of and slidably supports the upper run of the adjacent conveyor belt 34. Mounted on and extending endwise of the frame 16 from each pair of roller support brackets 48, at the delivery end of the frame, is a horizontal outfeed platform 63. Each outfeed platform is located substantially flush with or just slightly below the upper runs of the adjacent conveyor belts 34 and has its inner edge located in close proximity to the adjacent belts, as shown.

The pair of laterally adjacent conveyors 26 in each conveyor tier 24 are driven from a common drive shaft 64 through a pair of independently operable clutch means 65. Each drive shaft is rotatably supported in the roller support brackets 48, 50 for its respective conveyor and is located inwardly of the adjacent snub roller 60 and parallel to the adjacent conveyor rollers 32. One end of each drive shaft extends into the space 14 between the conveyor unit 12a and the adjacent conveyor unit 12b. Fixed to this extending end of each drive shaft is a sprocket 66.

The clutch means 65 for the pair of laterally adjacent conveyors 26 in each conveyor tier 24 comprise a pair of pulleys 68 and 70 fixed to the adjacent drive shaft 64 just inwardly of the corresponding outboard roller support brackets 48. Coaxially fixed to the outboard ends of the rollers 32 are pulleys 72 and 74, which are aligned with the pulleys 68 and 70 respectively, on the adjacent drive shaft 64. A drive belt 76 is loosely trained about each pair of aligned pulleys 68, 72 and 70, 74 so as to permit each drive shaft to turn freely without driving the adjacent conveyor rollers 32. The clutch means 65 for each pair of laterally adjacent conveyors 26 further comprise a pair of clutch levers 78 pivotally mounted intermediate their ends on the inner sides of the corresponding outboard support brackets 48. The outer end of each lever overlies the adjacent drive belt 76 and rotatably mounts a pulley 80 which is located below the upper run of the adjacent belt. An idler pulley 82 is rotatably mounted on the inner side of each bracket 48 over and in contact with the upper run of the adjacent belt 76, close to the adjacent conveyor roller 72.

Each clutch lever 78 is pivotally movable between the position shown in FIGURE 9 and the position shown in FIGURE 10. The lever position shown in FIGURE 9 is hereinafter referred to as the disengaged position. The lever position shown in FIGURE 10 is hereinafter referred to as the engaged position. At this point, it is evident that when any one of the clutch levers 78 occupies its disengaged position, the corresponding drive shaft 64 is permitted to turn freely without driving the adjacent conveyor roller 32. As shown in FIGS. 9, 10, and 12, a part of clutch lever 78 extends over pulley 80 and belt 76, which part in the disengaged position (FIG. 9) prevents belt 76 from rising up to the engaged position (FIG. 10). When a clutch lever is rotated to its engaged position, the pulley 80 on the lever is urged upwardly against the upper run of the adjacent drive belt 76, thereby tensioning the belt to drivably couple the adjacent drive shaft 64 and conveyor roller 32. The corresponding conveyor belt 34 is then conditioned to be driven from its respective drive shaft 64.

Mounted on the frame 16 over the inner end of each clutch lever 78 is a lever actuator 84. Each illustrated actuator comprises a pneumatic cylinder 86 containing a piston (not shown), the rod 88 of which is pivotally connected to the inner end of the adjacent clutch lever. Contained within each cylinder is a spring (not shown) which urges the corresponding piston upwardly in the cylinder and, thereby urges the adjacent clutch lever 78 to its disengaged position of FIGURE 9. Admission of air under pressure to the upper end of each actuator cylinder 86 drives the corresponding piston downwardly in the cylinder and, thereby rotates the adjacent clutch lever 78 to its engaged position of FIGURE 10. Each actuator cylinder is connected, through a solenoid valve 89, to a source (not shown) of air under pressure.

Mounted on the frame 16 over opposite ends, respectively, of each conveyor 26 are electrical switches 90 and 92. Each switch has a depending actuator 94 which is pivotally movable between its solid and broken line positions illustrated in the drawings. Normally, each switch actuator occupies its solid line position which position, accordingly, is hereinafter referred to as the normal position. The broken line position of each actuator is hereinafter referred to as its extended position. Each switch 90 at the loading end of the apparatus is opened in response to movement of its actuator 94 to its normal position and is closed in response to movement of the actuator to its extended position. Each switch 92 at the delivery end of the apparatus is closed in response to movement of its actuator to its normal position and is opened in response to movement of the actuator to its extended position. Mounted on the loading end of the apparatus, adjacent each conveyor 26 is a toggle switch 96.

Figure 13:
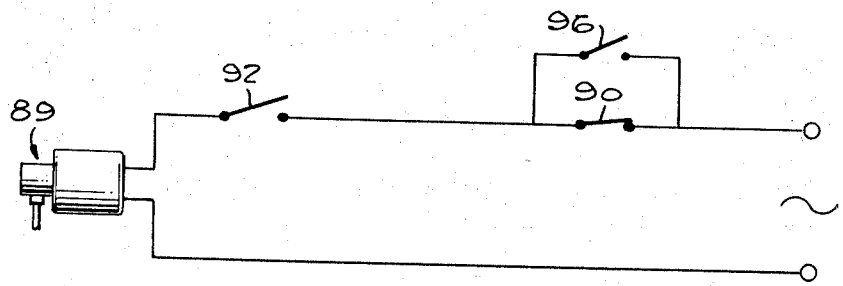
FIGURE 13 is a schematic diagram of a portion of an electrical-pneumatic control system embodied in the apparatus in normal position.
Figure 6:
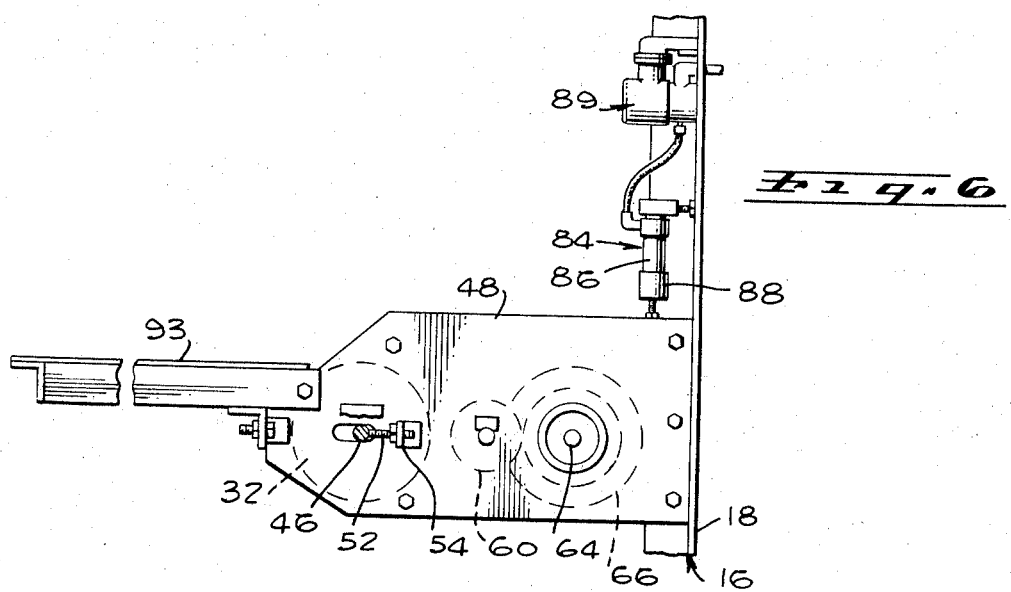
FIGURE 6 is a view looking in the direction of the arrows on line 6—6 in FIGURE 5.

As shown in FIGURE 13, the clutch solenoid valve 89 for each conveyor 26 is connected to an electrical power supply through the switches 90, 92, and 96 for the respective conveyor. The two switches 90 and 92 for each conveyor are connected in electrical series with the corresponding solenoid valve. The toggle switch 96 for each conveyor is connected in parallel with the corresponding valve switch 90. Each toggle switch 96 has an "on" position wherein it shunts the respective valve switch 90 and an "off" position wherein the shunt connection across the respective valve switch 90 is interrupted. It is evident at this point, therefore, that operation of each toggle switch 96 to its "off" position conditions the corresponding clutch solenoid valve 89 to be energized, and thereby admit air under pressure to the corresponding clutch actuator cylinder 86, in response to simultaneous closure of the two switches 90 and 92 for the respective valve. Operation of each toggle switch 96 to its "on" position conditions the corresponding valve to be energized, and thereby admit air under pressure to the corresponding actuator cylinder in response to closure of only the switch 92 for the respective valve.

As noted earlier, the several conveyor units 12a, 12b, and 12c, are essentially identical and differ only in certain minor variations. One of these variations resides in the fact that the conveyors 26 of the adjacent conveyor units are vertically offset or staggered, as shown in FIGURE 2. This permits the adjacent conveyor units to be placed in close proximity without interference of the laterally projecting parts of the conveyors, such as the drive shafts 64. Another difference between the conveyor units resides in the different vertical spacings between the adjacent conveyor tiers 24 of the units. This difference in spacing accommodates the conveyor units to handle linen stacks of different standard heights. A final difference between the conveyor units resides in the fact that the conveyor drive shafts 64 on the unit 12a extend beyond the lefthand side of the unit as it is viewed in FIGURE 2, while the drive shafts of the two remaining units 12b and 12c extend beyond the righthand sides of the latter units.

The conveyors 26 of the several conveyor units 12a, 12b, and 12c are all powered from a common drive motor 98. Motor 98 is mounted on top of the center conveyor unit 12b. Located to the rear of the motor is a primary drive shaft 100 which extends laterally across the tops of the three conveyor units and is rotatably supported at its ends in bearings 102. Motor 98 is drivably coupled to the drive shaft 100 through a speed reducer 104 and a sprocket chain 106. Fixed to the drive shaft 100 are three sprockets 108. Each of these sprockets is associated with one of the conveyor units 12a, 12b, and 12c and is vertically aligned with the sprockets 66 on the drive shafts 64 of its respective conveyor unit. For convenience, these latter drive shafts are hereinafter referred to as secondary drive shafts. The aligned sprockets 66 and 108 on the primary and secondary drive shafts are interconnected by sprocket chains 110 which are trained about these sprockets, and additional idler sprockets 112 on the conveyor units, in the manner illustrated in FIGURE 4. Accordingly, motor 98 is conditioned to drive all of the conveyors 26 in the same direction. The motor is energized in a direction to effect movement of the upper runs of the conveyor belts 34 toward the delivery end of the apparatus.

In use, the illustrated conveyor and storage apparatus 10 is installed in a linen supply plant with the loading end of the apparatus located at the finishing department and the delivery end of the apparatus located at the order department. Each conveyor is assigned to handle particular finished items, such as towels, or sheets, or garments, for example, which are stacked on the conveyor in the manner illustrated in broken lines in FIGURE 2. When initially loading the apparatus with the various finished items to be handled, the toggle switches 96 for all of the conveyors 26 are set in their "off" position so that each conveyor remains stationary until the actuator 94 for its respective loading end valve switch 90 is moved to its extended position. When loading a stack of finished linen items onto their respective conveyor 26, the stack is slid endwise onto the loading end of the conveyor in such a way that the stack engages the adjacent switch actuator 94 and moves the latter to its extended position. This extension of the actuator closes the corresponding switch 90 thereby energizing the clutch solenoid valve 89 and engaging the clutch 65 for the respective conveyor. The conveyor is then driven by the motor 98 until the stack of linen is advanced toward the delivery end of the apparatus to a position wherein the stack clears the actuator. The actuator then returns to its normal position and the conveyor stops. This action is repeated for each of the conveyors until the leading linen stack on each conveyor finally arrives at the delivery end of the apparatus and moves the actuator 94 for the corresponding delivery end valve switch 92 to its extended position. This opens the latter switch and thereby inactivates the corresponding clutch solenoid valve 89. Each conveyor will then remain stationary even though its respective loading end switch 90 is closed. The several toggle switches 96 are now set in their "on" positions, thereby inactivating the several loading end valve switches 90.

The apparatus 10 is now conditioned for operation. In this condition, each conveyor 26 is loaded from end to end with stacks of its respective finished linen items. The leading stacks at the delivery ends of the conveyors are located adjacent the outfeed platforms 63.

When filling customers' orders, the leading stack of linen on each conveyor is slid forwardly onto the adjacent outfeed platform 63. When a stack of linen items is thus moved from the delivery end of a conveyor onto the adjacent platform 63 the actuator 94 for the corresponding delivery end valve switch 92 is released to return to its normal position. This effects immediate engagement of the clutch 65 for the conveyor, which is then driven to advance the next linen stack on the conveyor to the delivery end of the apparatus. When filling customers' orders, the order clerk selects the required items from the linen stacks positioned on the outfeed platforms 63. When the stack on any platform is depleted the next stack on the corresponding conveyor 26 is moved forwardly onto the platform, thereby initiating automatic operation of the conveyor to advance the next linen stack thereon to the delivery end of the conveyor. In the event that an order calls for a number of items exceeding the number of items in one stack, the above process is repeated until the required number of items are obtained. It is evident, therefore, that the delivery end of the apparatus 10 provides, at the order department, a readily accessible continuously filled array of all of the various finished items of linen on the apparatus from which selected items may be quickly and easily removed as needed to fill customers' orders. Whenever, a stack of linen items is removed from the delivery end of a conveyor 26, an additional stack of the same items may be placed on the loading end of the conveyor, thereby to constantly maintain each conveyor in its fully loaded position, or the conveyor may be allowed to become empty before any additional stacks of linen are placed on the loading end of the conveyor. Each conveyor, then, serves as a storage facility for storing its respective items until they are needed to fill customers' orders. If a conveyor is not maintained in its fully loaded condition, of course, a gap will exist between at least two adjacent linen stacks on the conveyor. It is evident, however, that under these conditions, when the leading stack is removed from the delivery end of the conveyor, the latter will be automatically continuously advanced until the following stack arrives at the delivery end of the apparatus.

It is now apparent that the present combined article conveyor and storage apparatus is ideally suited for use in handling finished linen in linen supply plants. It is further apparent, however, that the apparatus of the invention is not limited in usefulness to the linen supply industry and may be used in other applications requiring the storage of a variety of items to be parceled and the transfer of such items for a supply station, where the items are placed on the apparatus, to an assembly station where the items are selectively assembled for parceling.

While a presently preferred embodiment of the invention has been disclosed for illustrative purposes, various modifications in the design, arrangement of parts, and instrumentalities of the invention are obviously possible within the spirit and scope of the following claims.

What is claimed as new in support of Letters Patent is:

1. In combination:
a frame, a primary drive shaft on one end of said frame, a number of secondary drive shafts rotatably mounted on said one end of said frame, said secondary drive shafts being arranged in several horizontal tiers disposed one above the other, each of said tiers containing a single secondary drive shaft, means for driving said primary drive shaft in rotation, means drivably coupling said primary shaft to each of said secondary shafts, a plurality of second shafts mounted on said one end of said frame in spaced parallel relation to said secondary drive shafts, and a plurality of laterally adjacent independently rotatably driven members on said second shafts, and means including selectively operable clutch means drivably coupling each secondary drive shaft to an adjacent rotatable driven member in such manner as to permit each of said rotatable driven members to be independently driven from an adjacent secondary drive shaft.

2. The combination of claim 1 wherein:
said frame comprises a number of separate frames each having several tiers of said secondary drive shafts, said frames being disposed in side by side, laterally spaced relation, said secondary drive shafts having projecting ends, respectively, extending into the spaces between adjacent frames, said means for drivably coupling said primary drive shaft to each of said secondary drive shafts being disposed in said spaces.

3. The combination of claim 1 wherein:
said means for driving said primary drive shaft in rotation comprises a motor mounted on said frame, and each said tier contains a pair of laterally adjacent driven members, each of the pair of driven members in each tier being approximately coaxially aligned.

4. In combination:
a frame, a primary drive shaft on one end of said frame, a number of secondary drive shafts rotatably mounted on said one end of said frame, said secondary drive shafts being arranged in several horizontal tiers disposed one above the other, each of said tiers containing a single secondary drive shaft, means for driving said primary drive shaft in rotation, means drivably coupling said primary shaft to each of said secondary shafts, a plurality of rotatably driven members mounted on said frame in spaced parallel relation to said secondary drive shafts, and means including selectively operable clutch means drivably coupling each secondary drive shaft to an adjacent rotatably driven member.

References Cited

UNITED STATES PATENTS

| | | | |
|---|---|---|---|
| 1,383,418 | 7/1921 | Needham | 74—722 XR |
| 2,004,571 | 6/1935 | Bothezat. | |
| 2,957,561 | 10/1960 | Musgrave | 74—221 XR |
| 3,002,395 | 10/1961 | Kaytor | 74—217 |
| 3,140,620 | 7/1964 | Ferara | 74—221 |

FRED C. MATTERN, JR., *Primary Examiner.*

J. A. WONG, *Assistant Examiner.*